United States Patent
Nakamura et al.

(10) Patent No.: US 10,464,286 B2
(45) Date of Patent: Nov. 5, 2019

(54) LAMINATED NONWOVEN FABRIC AND MANUFACTURING METHOD THEREOF

(71) Applicant: PANASONIC INTELLECTUAL PROPERTY MANAGEMENT CO., LTD., Osaka (JP)

(72) Inventors: Taichi Nakamura, Osaka (JP); Takayoshi Yamaguchi, Osaka (JP); Koji Motomura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 185 days.

(21) Appl. No.: 15/352,739

(22) Filed: Nov. 16, 2016

(65) Prior Publication Data

US 2017/0151752 A1 Jun. 1, 2017

(30) Foreign Application Priority Data

Nov. 30, 2015 (JP) .................. 2015-233476

(51) Int. Cl.
| | |
|---|---|
| B32B 3/10 | (2006.01) |
| B32B 5/26 | (2006.01) |
| B32B 3/26 | (2006.01) |
| B32B 5/02 | (2006.01) |
| B32B 7/12 | (2006.01) |
| B32B 5/14 | (2006.01) |
| D04H 1/4374 | (2012.01) |
| D04H 1/593 | (2012.01) |

(52) U.S. Cl.
CPC .............. *B32B 5/26* (2013.01); *B32B 3/26* (2013.01); *B32B 5/022* (2013.01); *B32B 5/14* (2013.01); *B32B 7/12* (2013.01); *D04H 1/4374* (2013.01); *D04H 1/593* (2013.01); *B32B 2307/40* (2013.01)

(58) Field of Classification Search
None
See application file for complete search history.

(56) References Cited

FOREIGN PATENT DOCUMENTS

| JP | 2014-114521 A | 6/2014 | |
|---|---|---|---|
| WO | 2013/121733 A1 | 8/2013 | |
| WO | WO-2013121733 A1 * | 8/2013 | ........... B01D 46/546 |

OTHER PUBLICATIONS

Machine translation of WO 2013121733 Retrieved on Jan. 22, 2019.*

* cited by examiner

*Primary Examiner* — Christopher M Polley
(74) *Attorney, Agent, or Firm* — Pearne & Gordon LLP

(57) ABSTRACT

A laminated nonwoven fabric includes first to third nonwoven fabrics and an adhesive sandwiched between at least the second nonwoven fabric and the third nonwoven fabric. The second nonwoven fabric contains second fibers and is laminated on the first nonwoven fabric containing first fibers, and the third nonwoven fabric contains third fibers and is laminated on the second nonwoven fabric on an opposite side to the first nonwoven fabric. An average fiber diameter of the first fibers is larger than that of the second fibers. The second nonwoven fabric has first and second regions which exist mixedly with each other, and a density of the second fibers in the second region is lower than that in the first region. A part of the adhesive is present between a portion of the first nonwoven and a portion of the third nonwoven fabric which face the second region.

7 Claims, 3 Drawing Sheets

LAMINATED NONWOVEN FABRIC AND MANUFACTURING METHOD THEREOF

BACKGROUND

1. Technical Field

The present disclosure relates to, for example, a laminated nonwoven fabric used for a filter medium of an air purifier, and a manufacturing method thereof.

2. Description of the Related Art

As a filter medium using a laminated nonwoven fabric, the filter medium used in an air purifier or the like, has been proposed (for example, International Publication No. WO2013/121733). Such a laminated nonwoven fabric includes a first nonwoven fabric which functions as a base material, a second nonwoven fabric which contains fibers having an average fiber diameter smaller than that of fibers of the first nonwoven fabric, and has a dust collection function, and a third nonwoven fabric which protects the second nonwoven fabric and has a dust collection function.

SUMMARY

According to the present disclosure, there is provided a laminated nonwoven fabric including a first nonwoven fabric containing first fibers, a second nonwoven fabric containing second fibers, a third nonwoven fabric containing third fibers, and an adhesive sandwiched between at least the second nonwoven fabric and the third nonwoven fabric. The second nonwoven fabric is laminated on the first nonwoven fabric, and the third nonwoven fabric is laminated on the second nonwoven fabric on an opposite side to the first nonwoven fabric. An average fiber diameter of the first fibers is larger than an average fiber diameter of the second fibers. The second nonwoven fabric has a first region and a second region which exist mixedly with each other, and a density of the second fibers in the second region is lower than a density of the second fibers in the first region. A part of the adhesive is present between a portion of the first nonwoven fabric facing the second region and a portion of the third nonwoven fabric facing the second region.

In a manufacturing method of a laminated nonwoven fabric of the present disclosure, a first nonwoven fabric containing first fibers, a raw material liquid containing a raw material resin as a raw material of second fibers and a solvent dissolving the raw material resin, and a third nonwoven fabric containing third fibers are prepared. Next, the second fibers are generated from the raw material liquid, and the second fibers are accumulated on one principal surface of the first nonwoven fabric so that a second nonwoven fabric is formed. An adhesive is supplied to the second nonwoven fabric. The third nonwoven fabric is laminated on the first nonwoven fabric via the adhesive and the second nonwoven fabric. An average fiber diameter of the first fibers is larger than the average fiber diameter of the second fibers. The second nonwoven fabric has a first region and a second region which exist mixedly with each other, and a density of the second fibers in the second region is lower than density d1 of the second fibers in the first region. A part of the adhesive is present between a portion of the first nonwoven fabric facing the second region and a portion of the third nonwoven fabric facing the second region.

According to the present disclosure, it is possible to suppress peeling between the nonwoven fabrics forming the laminated nonwoven fabric.

DETAILED DESCRIPTION OF PREFERRED EMBODIMENTS

Figure 1A:
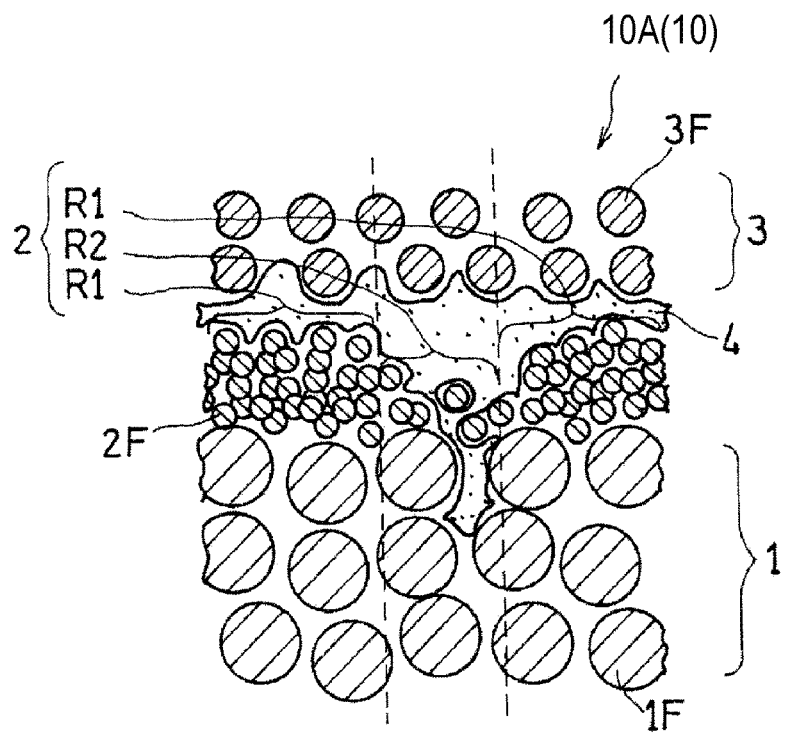
FIG. 1A is a sectional view schematically illustrating main portions of a laminated nonwoven fabric according to an embodiment of the present disclosure.

Prior to description of embodiments of the present disclosure, a problem of a laminated nonwoven fabric of the related art will be described briefly. When the laminated nonwoven fabric disclosed in International Publication No. WO2013/121733 is formed in a pleat shape or cut, the second nonwoven fabric and the third nonwoven fabric may be peeled off from the first nonwoven fabric. If the second nonwoven fabric and the third nonwoven fabric are peeled off, dust collection efficiency is considerably reduced in a case where the laminated nonwoven fabric is used as a filter medium.

A laminated nonwoven fabric according to the present embodiment includes a first nonwoven fabric containing first fibers and containing first fibers; a second nonwoven fabric laminated on the first nonwoven fabric and containing second fibers; a third nonwoven fabric laminated on a principal surface of the second nonwoven fabric on an opposite side to the first nonwoven fabric and containing third fibers; and an adhesive. Average fiber diameter D1 of the first fibers and average fiber diameter D2 of the second fibers satisfy the relationship of D1>D2. The nonwoven fabric containing the fibers indicates that the fibers are contained as main components. In this case, the content of the main components is 80% by weight or greater. For example, the first nonwoven fabric contains, as main components, the first fibers having the average fiber diameter larger than that of the second fibers forming the second nonwoven fabric.

The laminated nonwoven fabric is manufactured, for example, by accumulating the second fibers on the first nonwoven fabric so as to manufacture a laminate of the first nonwoven fabric and the second nonwoven fabric, applying an adhesive on an outer surface of the second nonwoven fabric of the laminate, and laminating the third nonwoven fabric thereon. In this case, for example, the laminate may be formed according to an electrostatic spinning method.

In other words, the second nonwoven fabric is laminated on the first nonwoven fabric without using an adhesive. In the electrostatic spinning method, the second fibers are generated by applying a high voltage to a raw material liquid in which a raw material resin as a raw material of the second fibers having a small average fiber diameter is dissolved into a solvent, and ejecting a raw material liquid having electric charge from a nozzle. The second fibers are accumulated on the first nonwoven fabric in a state in which a very small amount of solvent remains, and are thus tightly adhered to the first fibers forming the first nonwoven fabric. As mentioned above, the first fibers forming the first nonwoven fabric and the second fibers are adhered to each other through point adhesion between the fibers, and thus the first nonwoven fabric and the second nonwoven fabric are easily peeled off from each other.

On the other hand, the second nonwoven fabric and the third nonwoven fabric are adhered to each other by using an adhesive. In the related art, an adhesive applied on the second nonwoven fabric is easily unevenly distributed between the second nonwoven fabric and the third nonwoven fabric. Thus, the second nonwoven fabric is easily peeled off from the first nonwoven fabric along with the third nonwoven fabric which is adhered to the second nonwoven fabric via the adhesive. As the second nonwoven fabric is thickened, the adhesive becomes more easily unevenly distributed between the second nonwoven fabric and the third nonwoven fabric, and thus there is an increasing tendency of peeling. However, in a case where an average fiber diameter of the second fibers is small, a contact area between the second nonwoven fabric and the adhesive is also reduced. In this case, even if the adhesive is unevenly distributed between the second nonwoven fabric and the third nonwoven fabric, peeling easily occurs between the second nonwoven fabric and the third nonwoven fabric.

Therefore, in the present embodiment, first region R1 and second region R2 which exist mixedly with each other are provided in the second nonwoven fabric. Density (mass per unit volume) d2 of the second fibers in second region R2 is lower than density d1 of the second fibers in first region R1. Thus, at least a part of the adhesive applied in second region R2 can stay on the second nonwoven fabric, and other parts thereof can pass through the second nonwoven fabric so as to reach the first nonwoven fabric. In other words, the adhesive applied in second region R2 is present between the first nonwoven fabric and the third nonwoven fabric so as to compound with second region R2, and can come into contact with both of the first nonwoven fabric and the third nonwoven fabric. Since average fiber diameter D1 of the first fibers is larger than average fiber diameter D2 of the second fibers, the adhesive can come into contact with the first nonwoven fabric in a larger area than in a case where the adhesive comes into contact with the second nonwoven fabric. Therefore, the first nonwoven fabric and the third nonwoven fabric are adhered to each other by adhesive strength greater than between the second nonwoven fabric and the third nonwoven fabric, and thus peeling between the nonwoven fabrics is suppressed. The second nonwoven fabric is sandwiched between the first nonwoven fabric and the third nonwoven fabric, and is thus hardly peeled off from either of the first nonwoven fabric and the third nonwoven fabric. Dust collection performance is ensured by first region R1.

In this laminated nonwoven fabric, the peeling strength between the first nonwoven fabric and the third nonwoven fabric is 50 to 300 mN in a case where the peeling strength is measured according to a method conforming to JIS Z0237 (corresponding to ISO 29862:2007) by using, for example, a test piece with a width 25 mm×a length 200 mm.

Mass M1 of the adhesive present between the first nonwoven fabric and the third nonwoven fabric facing first region R1 and mass M2 of the adhesive present between the first nonwoven fabric and the third nonwoven fabric facing second region R2 preferably satisfy a relationship of M1<M2. With this configuration, the adhesiveness between both of the first nonwoven fabric and the third nonwoven fabric facing second region R2 further increases. On the other hand, an amount of the adhesive in the first nonwoven fabric and the third nonwoven fabric facing first region R1 is small, and thus an increase in the pressure loss of the whole of the laminated nonwoven fabric is suppressed.

Preferably, the adhesive is not present between the first nonwoven fabric and first region R1. Preferably, the adhesive does not permeate into the first nonwoven fabric facing first region R1. This is because an increase in the pressure loss of the whole of laminated nonwoven fabric is more easily suppressed.

In a case where the adhesive permeates into the first nonwoven fabric facing first region R1, the extent thereof is preferably small. For example, it is assumed that the adhesive is present in a region ranging over distance P1 from a principal surface of the first nonwoven fabric facing the second nonwoven fabric in a portion of the first nonwoven fabric facing first region R1, and is present in a region ranging over distance P2 from the principal surface of the first nonwoven fabric facing the second nonwoven fabric in a portion of the first nonwoven fabric facing second region R2. In this case, distance P1 and distance P2 preferably satisfy a relationship of P1<P2.

The transmittance of light with a wavelength of 380 nm in first region R1 is preferably lower than 10%, and the transmittance of the light in second region R2 is equal to or higher than 15%. Consequently, the adhesive can easily reach the first nonwoven fabric facing second region R2, and the adhesive can be easily unevenly distributed between first region R1 and the first nonwoven fabric.

The first nonwoven fabric may have third region R3 and fourth region R4 which exist mixedly with each other and have different densities of the first fibers. Density d4 of the first fibers in fourth region R4 is preferably lower than density d3 of the first fibers in third region R3. In this case, preferably, first region R1 faces third region R3, and second region R2 faces fourth region R4. In this configuration, regions of the first nonwoven fabric and the second nonwoven fabric whose fiber densities are small face each other, and thus it is possible to further suppress an increase in the pressure loss.

From the viewpoint of maintaining the strength, preferably, the transmittance of light with a wavelength of 380 nm in third region R3 is lower than 20%, and the transmittance of the light in fourth region R4 is equal to or higher than 20%. This is because, in a case where the adhesive is melted through heating, it becomes easier to suppress deformation of the laminated nonwoven fabric.

A difference $t4_{ave}-t3_{ave}$ between average value $t3_{ave}$ of transmittance t3 and average value $t4_{ave}$ of transmittance t4 and a difference $t2_{ave}-t1_{ave}$ between average value $t1_{ave}$ of transmittance t1 and average value $t2_{ave}$ of transmittance t2 preferably satisfy a relationship of $(t4_{ave}-t3_{ave})>(t2_{ave}-t1_{ave})$. In other words, a density difference of the second fibers in the second nonwoven fabric is preferably smaller than a density difference of the first fibers in the first nonwoven fabric. Since the density difference of the second fibers having a dust collection function is small, in-surface uniformity of dust collection efficiency is easily ensured.

Average mass of the second nonwoven fabric per unit area is preferably 0.5 g/m$^2$ or more and 8 g/m$^2$ or less. With this configuration, dust collection efficiency is improved. Even in a case where such a relatively thick second nonwoven fabric is sandwiched between the first nonwoven fabric and the third nonwoven fabric, the second fibers of the second nonwoven fabric have a density difference, and thus the adhesive can be brought into contact with both of the first nonwoven fabric and the third nonwoven fabric. Therefore, peeling between the nonwoven fabrics is suppressed.

In a manufacturing method of a laminated nonwoven fabric in the present embodiment, first, a first nonwoven fabric containing first fibers, a raw material liquid containing a raw material resin as a raw material of second fibers and a solvent dissolving the raw material resin, and a third nonwoven fabric containing third fibers, are prepared. Next, the second fibers are generated from the raw material liquid, and the second fibers are accumulated on one principal surface of the first nonwoven fabric so that a second nonwoven fabric is formed. An adhesive is supplied to the second nonwoven fabric. The third nonwoven fabric is laminated on the first nonwoven fabric via the adhesive and the second nonwoven fabric. Average fiber diameter D1 of the first fibers is larger than average fiber diameter D2 of the second fibers. The second nonwoven fabric has a first region and a second region which exist mixedly with each other, and a density of the second fibers in the second region is lower than density d1 of the second fibers in the first region. A part of the adhesive is present between a portion of the first nonwoven fabric facing the second region and a portion of the third nonwoven fabric facing the second region. In the laminated nonwoven fabric manufactured according to the method, it is possible to suppress peeling between the nonwoven fabrics forming the laminated nonwoven fabric.

In this case, preferably, the first nonwoven fabric has third region R3 at a position facing first region R1, and fourth region R4 at a position facing second region R2, and density d4 of the first fibers in fourth region R4 is lower than density d3 of the first fibers in third region R3. In the laminated nonwoven fabric obtained according to this method, peeling between the nonwoven fabrics is further suppressed.

Hereinafter, each nonwoven fabric and an adhesive will be described in detail as a form appropriate for a filter medium of an air purifier. An application of the laminated nonwoven fabric is not limited thereto.

(First Nonwoven Fabric)

A first nonwoven fabric functions as a base material for holding the shape of a laminated nonwoven fabric. In a case of subjecting the laminated nonwoven fabric to pleating, the first nonwoven fabric works as a base material, thereby holding the shape of a pleat.

The first nonwoven fabric contains first fibers. Materials of the first fibers are not particularly limited, and may include, for example, glass fibers, cellulose, acrylic resin, polypropylene (PP), polyethylene (PE), polyester (for example, polyethylene terephthalate (PET) and polybutylene terephthalate), polyamide (PA), or mixtures thereof. Above all, as materials of the first fibers, PET or cellulose is preferably used from the viewpoint of holding the shape. Average fiber diameter D1 of the first fibers is not particularly limited, and is, for example, 1 µm to 40 µm, and is preferably 5 µm to 20 µm.

Average fiber diameter D1 is an average value of diameters of the first fibers. The diameter of the first fiber is a diameter of a section perpendicular to in a length direction of the first fiber. In a case where such a section is not circular, a maximum diameter may be considered as the diameter. A width in a direction perpendicular to the length direction of the first fiber when viewed from the normal direction of one principal surface of the first nonwoven fabric may be regarded as the diameter of the first fiber. Average fiber diameter D1 is an average value of diameters of, for example, any ten first fibers contained in the first nonwoven fabric at any locations. This is also the same for average fiber diameters D2 and D3 which will be described later.

The first nonwoven fabric is manufactured by using, for example, a spun bonding method, a dry method (for example, an air-laid method), a wet method, a melt blow method, a needle punch method, or the like, and a manufacturing method thereof is not particularly limited. Above all, the first nonwoven fabric is preferably manufactured by using the wet method in that it is easy to form a nonwoven fabric appropriate for a base material.

A pressure loss of the first nonwoven fabric is also not particularly limited. Above all, in a case of performing measurement with a measuring machine in conformity with the regulations of JIS B9908, Form 1, an initial pressure loss of the first nonwoven fabric is preferably about 1 Pa to 10 Pa. As long as the initial pressure loss of the first nonwoven fabric falls within this range, an initial pressure loss of the whole of laminated nonwoven fabric is also reduced. In the test method in the above mentioned Form 1, a pressure loss is measured as follows. A filter unit having the laminated nonwoven fabric is held in a unit fixer without leakage of air. A static pressure measurer is attached to the filter unit. The static pressure measurer includes straight tubes sandwiching the filter unit therebetween, and the straight tubes are provided with static pressure measurement holes, respectively, perpendicular to tube walls on an upstream side and a downstream side. In this state, a blower sends wind to the filter unit in a rated air volume. The static pressure on the upstream side and that on the downstream side are measured by manometers which are connected to the static pressure measurement holes via the tubes, respectively, and thus the pressure loss is obtained.

Thickness T1 of the first nonwoven fabric is preferably 50 µm to 500 µm, and is more preferably 150 µm to 400 µm, from the viewpoint of pressure loss. Thickness T of the nonwoven fabric is, for example, an average value of thicknesses of any ten locations in the nonwoven fabric (the same applies hereinafter). The thickness is a distance between two principal surfaces of the nonwoven fabric. Specifically, an image of a section of the nonwoven fabric is captured, and, when a line perpendicular to one surface is drawn from any one point on one principal surface of the nonwoven fabric to the other principal surface, among fibers on the line, a distance between outsides (outer dimensions) of two fibers which are most distant from each other is obtained as thickness T of the nonwoven fabric. This is similarly performed on a plurality of any other points (for example, nine points) so that thicknesses of the nonwoven fabric are calculated, and a numerical value obtained by averaging the thicknesses is used as thickness T of the nonwoven fabric. When above thickness T is calculated, an image having undergone a binarization process may be used. As will be described later, in a case where the first nonwoven fabric includes a dense region (third region R3) of the first fibers and a coarse region (fourth region R4) thereof, thicknesses of any five locations in third region R3 and fourth region R4 are measured, and an average value thereof is calculated.

Mass per unit area of the first nonwoven fabric is preferably 10 g/m$^2$ to 80 g/m$^2$, and is more preferably 35 g/m$^2$ to 60 g/m$^2$, from the viewpoint of pressure loss. In a case where the first nonwoven fabric includes third region R3 and fourth region R4, the mass indicates average mass of third region R3 and fourth region R4.

(Second Nonwoven Fabric)

The second nonwoven fabric contains second fibers having average fiber diameter D2 smaller than average fiber diameter D1 of the first fibers, and has a function of capturing dust. Average fiber diameter D2 is preferably 1/10 or less of average fiber diameter D1 (D2≤D1/10), and is more preferably D1/100 or less of average fiber diameter D1 (D2≤D1/100). Average fiber diameter D2 is preferably 1/1000 or more of average fiber diameter D1. As long as average fiber diameter D2 falls within this range, a pressure loss is reduced and dust collection efficiency also tends to increase. Specifically, average fiber diameter D2 is equal to or less than 3 μm. Average fiber diameter D2 is preferably equal to or less than 1 μm, and is more preferably equal to or less than 300 nm. Average fiber diameter D2 is preferably equal to or more than 30 nm, and is more preferably equal to or more than 50 nm.

Materials of the second fibers are not particularly limited, and may include, for example, polymers such as PA, polyimide (PI), polyamideimide (PAI), polyetherimide (PEI), polyacetal (POM), polycarbonate (PC), polyether ether ketone (PEEK), polysulfone (PSF), polyethersulfone (PES), polyphenylene sulfide (PPS), polytetrafluoroethylene (PTFE), polyarylate (PAR), polyacrylonitrile (PAN), polyvinylidene fluoride (PVDF), polyvinyl alcohol (PVA), polyvinyl acetate (PVAc), PP, PET, and polyurethane (PU). These materials may be used alone or in combination of two or more kinds thereof. Above all, in a case where the second fibers are formed by using an electrostatic spinning method, PES is preferably used. PVDF is preferably used in that average fiber diameter D2 is easily reduced.

Thickness T2 of the second nonwoven fabric is preferably 0.5 μm to 500 μm, and is more preferably 1 μm to 450 μm, from the viewpoint of pressure loss. The thickness indicates an average thickness of first region R1 and second region R2. Thickness T2 may be calculated in the same manner as thickness T1. In a case where measurement is performed in the same condition as described above, an initial pressure loss of the second nonwoven fabric is preferably about 5 Pa to 40 Pa.

Mass per unit area of the second nonwoven fabric is preferably 0.5 g/m² to 8 g/m², and more preferably 0.9 g/m² to 7 g/m², from the viewpoint of dust collection efficiency. Even in a case where such a relatively thick second nonwoven fabric is sandwiched between the first nonwoven fabric and the third nonwoven fabric, the second fibers of the second nonwoven fabric have a density difference, and thus the adhesive can be sandwiched between the first nonwoven fabric and second region R2, and between second region R2 and the third nonwoven fabric. Therefore, it is possible to suppress peeling between the nonwoven fabrics while increasing the dust collection efficiency. The mass indicates average mass of first region R1 and second region R2.

(Third Nonwoven Fabric)

The third nonwoven fabric has a function of collecting relatively large dust, and functions as a protection material for protecting the second nonwoven fabric from various external loads. The third nonwoven fabric preferably has undergone a charging process from the viewpoint of dust collection efficiency.

The third nonwoven fabric contains third fibers. Materials of the third fibers are not particularly limited, and may exemplify the same materials as those of the first nonwoven fabric. Above all, PP is preferably used in that the material is easily charged. Average fiber diameter D3 of the third fibers is not particularly limited. Average fiber diameter D3 is, for example, 0.5 μm to 20 μm, and is preferably 5 μm to 20 μm.

A manufacturing method of the third nonwoven fabric is not particularly limited, and the methods exemplified in the first nonwoven fabric may be exemplified in the same manner. Above all, the third nonwoven fabric is preferably manufactured by using the melt blow method from the viewpoint that it is easy to form a nonwoven fabric having a small fiber diameter appropriate for a filter medium.

Thickness T3 of the third nonwoven fabric is not particularly limited, and may be 100 μm to 500 μm, and is preferably 150 μm to 400 μm. Mass per unit area of the third nonwoven fabric is not particularly limited, and may be 10 g/m² to 50 g/m², and is preferably 10 g/m² to 30 g/m².

A pressure loss of the third nonwoven fabric is not particularly limited. Above all, in a case where measurement is performed in the same condition as described above, an initial pressure loss of the third nonwoven fabric is preferably about 10 Pa to 50 Pa. As long as the initial pressure loss of the third nonwoven fabric falls within this range, a pressure loss of the whole of laminated nonwoven fabric is also reduced.

(Adhesive)

The kind of adhesive is not particularly limited, and may be, for example, a hot melt adhesive having a thermosetting resin as a main component. Examples of the thermosetting resin may include PU, polyester such as PET, copolyester such as urethane modified copolymer polyester, PA, and polyolefin (for example, PP or PE). A melting point of the adhesive is preferably about 60° C. to 140° C.

Average mass of the adhesive attached to the laminated nonwoven fabric is not particularly limited, and is preferably 0.5 g/m² to 15 g/m², more preferably 1 g/m² to 10 g/m², most preferably 3 g/m² to 9 g/m², from the viewpoint of adhesiveness and pressure loss.

The adhesive is preferably sprayed in a solid state in that the adhesive is easily sandwiched between the first nonwoven fabric and second region R2. The solid state is a state in which a predetermined shape is held, and is, for example, a granular state. Average particle diameter D50 of the granular adhesive is not particularly limited, and is, for example, 150 μm to 350 μm, and preferably 180 μm to 300 μm. Average particle diameter D50 is a median diameter in a volume particle size distribution obtained by a laser diffraction type particle size distribution measurer (this also applies hereinafter).

(Laminated Nonwoven Fabric)

Figure 1B:
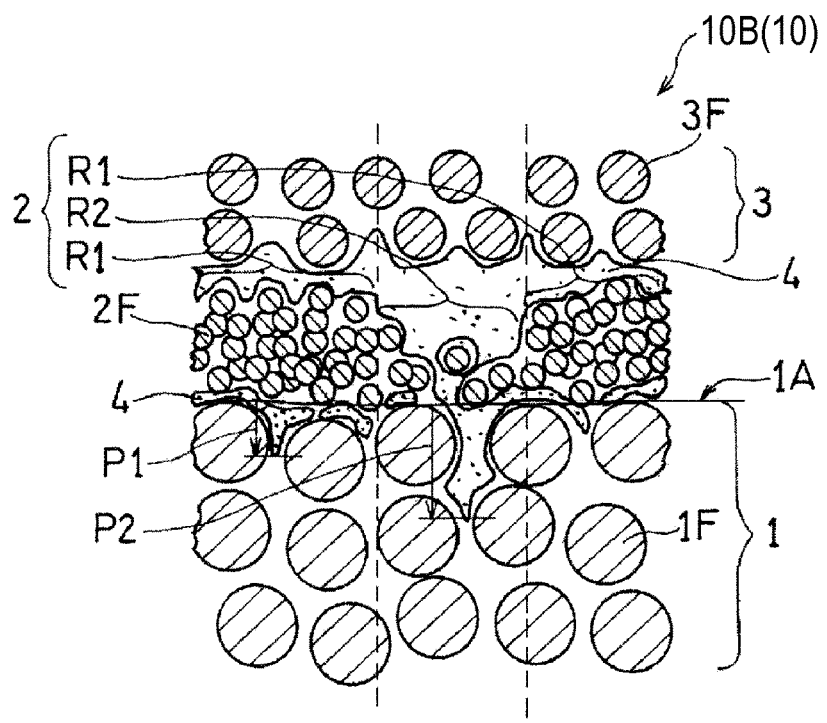
FIG. 1B is a sectional view schematically illustrating main portions of another laminated nonwoven fabric according to the embodiment of the present disclosure.
Figure 1C:
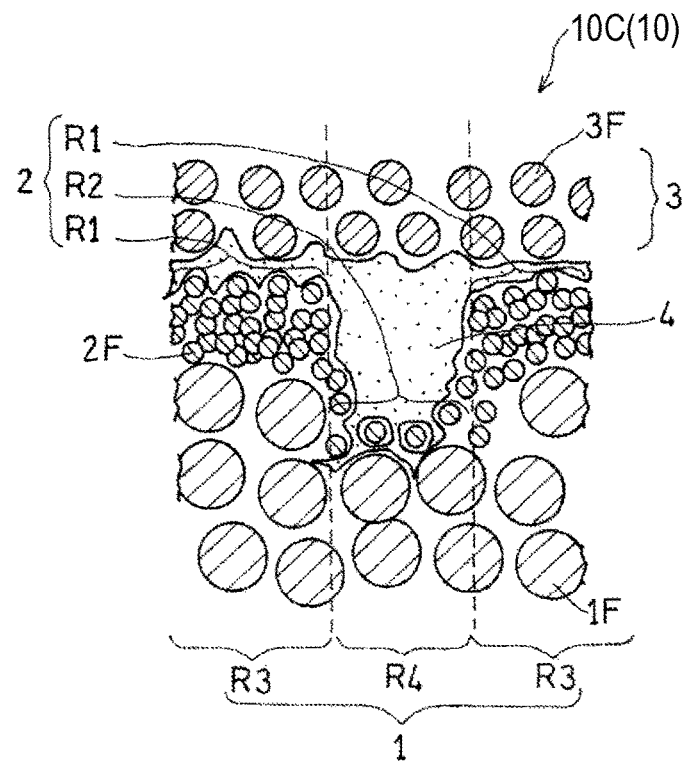
FIG. 1C is a sectional view schematically illustrating main portions of still another laminated nonwoven fabric according to the embodiment of the present disclosure.

Hereinafter, embodiments of a laminated nonwoven fabric will be described in detail with reference to FIGS. 1A to 1C. FIGS. 1A to 1C are sectional views schematically illustrating main portions of laminated nonwoven fabric 10 according to the present embodiment. FIG. 1A illustrates laminated nonwoven fabric 10A, FIG. 1B illustrates laminated nonwoven fabric 10B, and FIG. 1C illustrates laminated nonwoven fabric 10C. FIGS. 1A to 1C illustrate only a part of adhesive 4 permeating into third nonwoven fabric 3. Adhesive 4 may permeate into third nonwoven fabric 3, and may not permeate thereinto. Adhesive 4 may be present inside first nonwoven fabric 1 or between the second nonwoven fabric and the third nonwoven fabric in a granular shape.

As illustrated in FIGS. 1A to 1C, adhesive 4 is sandwiched between first region R1 of second nonwoven fabric 2 and third nonwoven fabric 3, between first nonwoven fabric 1 and second region R2, and between third nonwoven fabric 3 and second region R2. In other words, adhesive 4 is sandwiched between at least the second nonwoven fabric and the third nonwoven fabric, and a part of adhesive 4 is present between a portion of first nonwoven fabric 1 facing second region R2 and a portion of third nonwoven fabric 3 facing second region R2.

As illustrated in FIG. 1B, adhesive 4 may be further sandwiched between first region R1 and first nonwoven fabric 1. In this case, mass M1 of the adhesive present between the first nonwoven fabric and the third nonwoven fabric facing first region R1 and mass M2 of the adhesive present between the first nonwoven fabric and the third nonwoven fabric facing second region R2 preferably satisfy a relationship of M1<M2. With this configuration, the adhesiveness of each portion of the first nonwoven fabric and the third nonwoven fabric facing second region R2 with respect to second region R2 further increases. On the other hand, an amount of the adhesive in each portion of the first nonwoven fabric and the third nonwoven fabric facing first region R1 is small, and thus an increase in the pressure loss of the whole of laminated nonwoven fabric 10B is suppressed. FIG. 1C illustrates a case where first nonwoven fabric 1 having a difference in the density of the first fibers is used. First nonwoven fabric 1 will be described later.

The mass (M1 or M2) of adhesive 4 sandwiched between the nonwoven fabrics may be replaced with a sectional area (A1 or A2) of adhesive 4 sandwiched between the nonwoven fabrics. For example, laminated nonwoven fabric 10 in which first nonwoven fabric 1 is located on a lower side is placed on a horizontal stand, and an image of a section of any region a including first region R1 and second region R2 is captured. Next, sectional area A1a of adhesive 4 present between first nonwoven fabric 1 and third nonwoven fabric 3 facing first region R1 is calculated. In this case, adhesive 4 permeating into first nonwoven fabric 1 and third nonwoven fabric 3 is excluded. Similarly, sectional area A2a of adhesive 4 present between first nonwoven fabric 1 and third nonwoven fabric 3 facing second region R2 is calculated. This is similarly performed on a plurality of any other regions (for example, nine locations such as regions b to j) so that sectional areas A1b to A1j and sectional areas A2b to A2j are calculated, and numerical values obtained by averaging the sectional areas are respectively used as sectional areas A1 and A2. Here, the respective regions are determined to have the same area. When sectional areas A1 and A2 are calculated, an image having undergone a binarization process may be used. Applied adhesive 4 is regarded to be homogeneous (to have the same specific gravity, for example) in first region R1 and second region R2, and thus calculated sectional areas A1 and A2 respectively correspond to mass M1 and mass M2.

Adhesive 4 is not preferably present between first nonwoven fabric 1 and first region R1. With this configuration, an increase in the pressure loss of the whole of laminated nonwoven fabric 10 is easily suppressed. In this case, most of adhesive 4 applied in first region R1 contributes to adhesion between second nonwoven fabric 2 and third nonwoven fabric 3.

Adhesive 4 may pass through first region R1 and second region R2 so as to permeate into first nonwoven fabric 1. In this case, since a pressure loss of the whole of laminated nonwoven fabric 10 is suppressed, an amount of adhesive 4 permeating into first nonwoven fabric 1 facing first region R1 is preferably small. For example, in a case where adhesive 4 is present in a region ranging over distance P1 from principal surface 1A of first nonwoven fabric 1 facing first region R1, and is present in a region ranging over distance P2 from principal surface 1A of first nonwoven fabric 1 facing second region R2, distance P1 and distance P2 preferably satisfy a relationship of P1<P2.

Distance P1 and distance P2 may be calculated as follows. For example, in the section of region a, thickness TR1 of first nonwoven fabric 1 facing first region R1 is obtained. Next, distance DR1 between adhesive 4 closest to a stand on which laminated nonwoven fabric 10 is mounted and the stand in adhesive 4 which has permeated into first nonwoven fabric 1 facing first region R1 is obtained. A difference between calculated thickness TR1 and distance DR1 is set as distance P1a. Similarly, thickness TR2 and distance DR2 of first nonwoven fabric 1 facing second region R2 are obtained, and a difference therebetween is obtained so as to be calculated as distance P2a. This is similarly performed on a plurality of any other regions (for example, nine locations such as regions b to j) so that distances P1b to P1j and P2b to P2j are calculated, and numerical values obtained by averaging the sectional areas are respectively used as distances P1 and P2. When distances P1 and P2 are calculated, an image having undergone a binarization process may be used.

Density d1 and density d2 of dense first region R1 of second fibers 2F and coarse second region R2 of second fibers 2F may be evaluated by using the transmittance of light with a wavelength of 380 nm. A wavelength of light for evaluating the transmittance is not limited thereto, and may be selected from a visible light range of, for example, 380 nm to 780 nm as appropriate. Above all, a wavelength of the light is preferably short, and is most preferably 380 nm, in that the influence of absorption of light in second fibers 2F is reduced, and thus a measurement error is reduced.

Threshold values of the transmittance of light in first region R1 and second region R2 may be set as appropriate. Above all, from the viewpoint of suppressing peeling between the nonwoven fabrics, transmittance t1 in first region R1 is preferably lower than 10%, and transmittance t2 in second region R2 is equal to or higher than 15%. Transmittance t2 is more preferably equal to or higher than 20%. This is because the adhesive easily permeates into a portion of first nonwoven fabric 1 facing second region R2.

A lower limit value of transmittance t1 is not particularly limited, but is preferably equal to or higher than 2%, and is more preferably equal to or higher than 5%, from the viewpoint of pressure loss. An upper limit value of transmittance t2 is not also particularly limited, but is preferably lower than 30%, and is more preferably lower than 25%, from the viewpoint of dust collection efficiency. The transmittance is measured by applying monochromatic light with a wavelength of 380 nm separated by a diffraction grating to a sample (second nonwoven fabric 2) through, for example, a slit having a width of 7 mm, by using a spectrophotometer. A ratio (t2/t1) of transmittance t2 to transmittance t1 is preferably 2 or higher and 12 or lower from the viewpoint of suppressing peeling between the nonwoven fabrics.

First region R1 and second region R2 are disposed in a swing of being mixed with each other. The mixed state indicates that first region R1 and second region R2 are distributed at random. Above all, first region R1 and second region R2 are preferably included in a region of 35 $mm^2$ of second nonwoven fabric 2 in a state of being mixed. A plurality of first regions R1 and second regions R2 exist mixedly with each other in such a small region, and thus peeling between the nonwoven fabrics is easily suppressed.

Here, first region R1 and second region R2 may be determined, for example, as follows. Second nonwoven fabric 2 of 35 $mm^2$ is divided into 25 parts each of 7 $mm^2$. Light with a wavelength of 380 nm is applied to the center of each part through a slit having a width of 7 mm, as described above, and the transmittance thereof is calculated. Parts whose transmittance is lower than 10% are sorted as first region R1, and parts whose transmittance is equal to or higher than 15% are sorted as second region R2.

A method of forming second nonwoven fabric 2 having first region R1 and second region R2 is not particularly limited. For example, in a case where second nonwoven fabric 2 is formed by using an electrostatic spinning method, there may be a method using an uneven target. In a case where first nonwoven fabric 1 is used as a target of electrostatic spinning, first nonwoven fabric 1 containing first fibers 1F having a density difference may be used. First nonwoven fabric 1 has an uneven surface (refer to FIG. 1C).

In the electrostatic spinning method, a raw material liquid of second fibers 2F and a target (first nonwoven fabric 1) are charged to different polarities. Thus, the raw material liquid ejected toward first nonwoven fabric 1 from a nozzle of an electrostatic spinning mechanism advances toward a protrusion (the dense region of the first fibers) of first nonwoven fabric 1 having a stronger electric field, and thus more second fibers 2F are accumulated. In other words, according to this method, a region (first region R1) in which a fiber density of second nonwoven fabric 2 is high is formed to face a region (third region R3) in which a fiber density of first nonwoven fabric 1 is large. In other words, according to this method, a region (second region R2) in which a fiber density of second nonwoven fabric 2 is low is formed to face a region (fourth region R4) in which a fiber density of first nonwoven fabric 1 is small.

Third region R3 and first region R1 facing each other indicates that, when first nonwoven fabric 1 and second nonwoven fabric 2 are peeled off from the laminated nonwoven fabric of 35 mm², each thereof is divided into 25 parts as described above, and the parts are determined as regions R1 to R4, 80% or higher (number) of parts determined as first region R1 face parts determined as third region R3. Similarly, fourth region R4 and second region R2 facing each other indicates that 80% or higher (number) of parts determined as second region R2 face parts determined as fourth region R4. Third region R3 and fourth region R4 may be determined in the same manner as first region R1 and second region R2. However, threshold values of third region R3 and fourth region R4 may be different from those of first region R1 and second region R2.

In a case where first nonwoven fabric 1 containing first fibers 1F having a density difference is used, a density difference of second nonwoven fabric 2 may be smaller than a density difference of first nonwoven fabric 1. In other words, a ratio d1/d2 of density d1 to density d2 and a ratio d3/d4 of density d3 to density d4 may satisfy a relationship of d1/d2<d3/d4.

Density d3 of the first fibers in third region R3 and density d4 of the first fibers in fourth region R4 of first nonwoven fabric 1 are not particularly limited. For example, as described above, in a case where densities d3 and d4 of the respective regions are evaluated by using the transmittance of light with a wavelength of 380 nm, transmittance t3 in third region R3 is preferably lower than 20%. Transmittance t4 in fourth region R4 is preferably equal to or higher than 20%, and is more preferably equal to or higher than 23%. This is because, in a case where first nonwoven fabric 1 is used as a target, first region R1 and second region R2 are easily formed. A lower limit value of transmittance t3 is not particularly limited, but is preferably equal to or higher than 5%, and is more preferably equal to or higher than 10%, from the viewpoint of pressure loss. An upper limit value of transmittance t4 is not also particularly limited, but is preferably lower than 40%, and is more preferably lower than 32%, from the viewpoint of strength. A ratio (t4/t3) of transmittance t4 to transmittance t3 is preferably 1.5 or higher and 8 or lower in that first region R1 and second region R2 are easily formed.

A difference $t4_{ave}-t3_{ave}$ between average value $t3_{ave}$ of transmittance t3 and average value $t4_{ave}$ of transmittance t4 and a difference $t2_{ave}-t1_{ave}$ between average value $t1_{ave}$ of transmittance t1 and average value $t2_{ave}$ of transmittance t2 preferably satisfy a relationship of $(t4_{ave}-t3_{ave})>(t2_{ave}-t1_{ave})$ in that in surface uniformity of dust collection efficiency is easily ensured. The average value of transmittance is calculated by averaging transmittances of the parts used for determining the regions as described above, for each region. For example, in a case where average transmittance $t1_{ave}$ of parts determined as first region R1 is 6%, and average transmittance $t2_{ave}$ of parts determined as second region R2 is 20%, a difference $t2_{ave}-t1_{ave}$ is 14%. For example, in a case where average transmittance $t3_{ave}$ of parts determined as third region R3 is 12.5%, and average transmittance $t4_{ave}$ of parts determined as fourth region R4 is 30%, a difference $t4_{ave}-t3_{ave}$ is 17.5%, and thus satisfies the above-described relationship. In a case where the average values of transmittances of the respective regions satisfy the relationship, the densities of the respective regions satisfy a relationship of d1/d2<d3/d4.

Laminated nonwoven fabric 10 may be manufactured according to a method including, for example, a preparation step, an electrostatic spinning step, an adhesive supplying step, and a laminate step. In the preparation step, first nonwoven fabric 1 containing first fibers 1F, a raw material liquid containing a raw material resin as a raw material of second fibers 2F and a solvent dissolving the raw material resin, and third nonwoven fabric 3 containing third fibers 3F are prepared. In the electrostatic spinning step, according to an electrostatic spinning method, second fibers 2F are generated from the raw material liquid, and second fibers 2F are accumulated on one principal surface of first nonwoven fabric 1 so that second nonwoven fabric 2 is formed. In the adhesive supplying step, adhesive 4 is supplied to the principal surface of second nonwoven fabric 2. In the laminate step, third nonwoven fabric 3 is laminated on first nonwoven fabric 1 via adhesive 4 and second nonwoven fabric 2.

The above-described manufacturing method of laminated nonwoven fabric 10 may be performed by, for example, a manufacturing system which conveys first nonwoven fabric 1 from an upstream side to a downstream side of the line, forms second nonwoven fabric 2 on the principal surface of conveyed first nonwoven fabric 1, and then laminates third nonwoven fabric 3 thereon.

Figure 2:
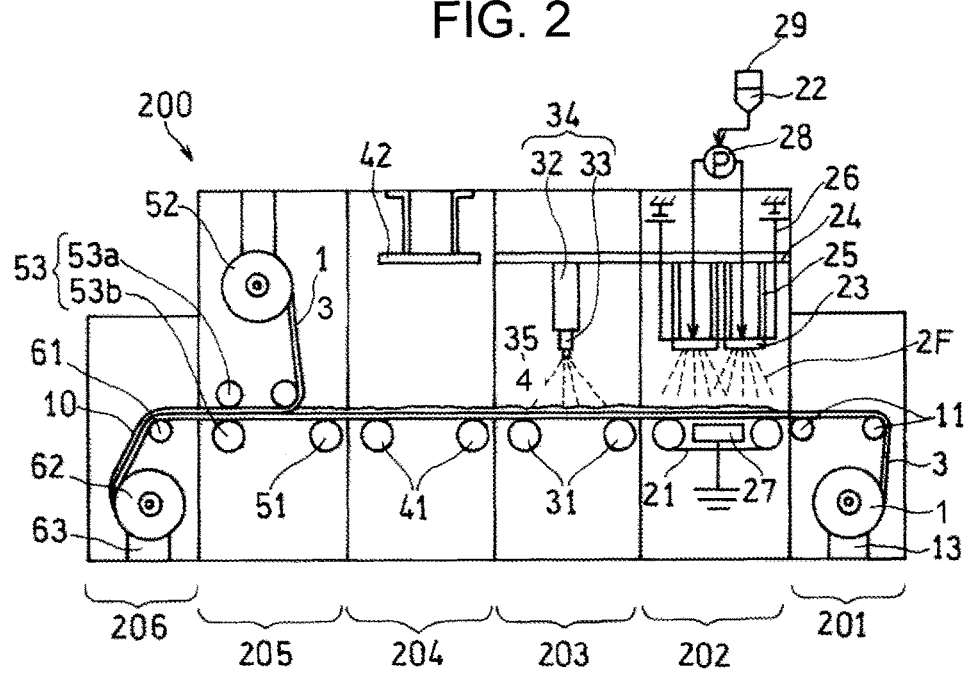
FIG. 2 is a diagram illustrating a configuration example of a manufacturing system used to manufacture the laminated nonwoven fabric according to the embodiment of the present disclosure.

Hereinafter, with reference to FIG. 2, a description will be made of a manufacturing method of the laminated nonwoven fabric and the manufacturing system performing the method, but the following system and manufacturing method do not limit the present disclosure. FIG. 2 is a diagram schematically illustrating an example of a configuration of the manufacturing system of laminated nonwoven fabric 10. Manufacturing system 200 includes a manufacturing line for manufacturing laminated nonwoven fabric 10.

Manufacturing system 200 includes first nonwoven fabric feeding device (feeding device) 201, second nonwoven fabric forming device (forming device) 202, adhesive spraying device (spraying device) 203, heating device 204, and third nonwoven fabric laminate device (laminate device) 205. Feeding device 201 feeds first nonwoven fabric 1 to a conveyance belt. Forming device 202 includes an electrostatic spinning mechanism which generates second fibers 2F from raw material liquid 22 by using an electrostatic force. Spraying device 203 sprays adhesive 4 from an upper side of second nonwoven fabric 2 sent from forming device 202. Heating device 204 melts sprayed adhesive 4. Laminate device 205 laminates third nonwoven fabric 3 on second nonwoven fabric 2 sent from heating device 204.

First, first nonwoven fabric 1 is prepared. In manufacturing system 200, first nonwoven fabric 1 is conveyed from the upstream side of the manufacturing line to the downstream side thereof. Feeding device 201 which accommodates therein first nonwoven fabric 1 wound in a roll form is provided on the most upstream side of manufacturing system 200. Feeding device 201 rotates first feed reel 12 with motor 13 so as to feed first nonwoven fabric 1 wound on first feed reel 12 to conveyance rollers 11.

First nonwoven fabric 1 is conveyed to forming device 202 including an electrostatic spinning unit (not illustrated) by conveyance rollers 11. The electrostatic spinning mechanism provided in the electrostatic spinning unit includes discharger 23 which is provided on an upper side in the apparatus and discharges raw material liquid 22 of second fibers 2F, a charger (which will be described later) which positively charges discharged raw material liquid 22, and conveyer 21 which is disposed to face discharger 23 and conveys first nonwoven fabric 1 from the upstream side to the downstream side. Conveyer 21 functions as a collector which collects second fibers 2F along with first nonwoven fabric 1. The number of electrostatic spinning units is not particularly limited, and may be one, or two or more.

In a case where there are a plurality of electrostatic spinning units and/or dischargers 23, an average fiber diameter of second fibers 2F to be formed may be changed for each electrostatic spinning unit or for each discharger 23. The average fiber diameter of second fibers 2F may be changed by adjusting ejection pressure of raw material liquid 22 which will be described later, an applied voltage, concentration of raw material liquid 22, a distance from discharger 23 to first nonwoven fabric 1, temperature, humidity, and the like. An amount of accumulated second fibers 2F is controlled by adjusting ejection pressure of raw material liquid 22, an applied voltage, concentration of raw material liquid 22, a conveyance speed of first nonwoven fabric 1, and the like.

A plurality of discharge outlets (not illustrated) of raw material liquid 22 are provided on discharger 23 side facing the principal surface of first nonwoven fabric 1. Although a distance between the discharge outlet of discharger 23 and first nonwoven fabric 1 varies depending on a scale of manufacturing system 200 or a desired fiber diameter, the distance may be, for example, 100 to 600 mm. Discharger 23 is supported by second support 25 in such a manner that its own longitudinal direction is parallel to the principal surface of first nonwoven fabric 1. Second support 25 is provided above electrostatic spinning device, and extends downwardly from first support 24 parallel to the conveyance direction of first nonwoven fabric 1. First support 24 may be movable so that discharger 23 is swung in a direction perpendicular to the conveyance direction of first nonwoven fabric 1.

The charger is formed of voltage applying device 26 applying a voltage to discharger 23, and counter electrode 27 provided to be parallel to conveyer 21. Counter electrode 27 is grounded (connected to the ground). Consequently, a potential difference (for example, 20 kV to 200 kV) corresponding to the voltage applied by voltage applying device 26 can be caused between discharger 23 and counter electrode 27. The configuration of the charger is not particularly limited. For example, counter electrode 27 may be negatively charged. The belt portion of conveyer 21 may be formed of a conductor instead of providing counter electrode 27.

Discharger 23 is formed of a conductor and has a long shape, and its interior is a cavity. The cavity functions as an accommodator accommodating raw material liquid 22 therein. Raw material liquid 22 is supplied from raw material liquid tank 29 to the cavity of discharger 23 by a pressure produced by pump 28 communicating with the cavity of discharger 23. Raw material liquid 22 is discharged from the discharge outlet toward the principal surface of first nonwoven fabric 1 by the pressure produced by pump 28. Discharged raw material liquid 22 causes electrostatic explosion to produce a fibrous material (second fibers 2F) during movement in a charged state in a space (generation space) between discharger 23 and first nonwoven fabric 1. Generated second fibers 2F are accumulated on first nonwoven fabric 1 so as to form second nonwoven fabric 2. In a case where first nonwoven fabric 1 has third region R3 and fourth region R4, second nonwoven fabric 2 having first region R1 and second region R2 corresponding to the respective regions is formed.

A solvent contained in raw material liquid 22 may be appropriately selected depending on the kind of raw material resin or a manufacturing condition. Examples of the solvent which can be used include methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl n-hexyl ketone, methyl n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, N,N-dimethylacetamide (DMAc), dimethyl sulfoxide, pyridine, and water. These may be used alone or in combination of plural kinds thereof. Above all, in a case where second fibers 2F containing PES are formed according to an electrostatic spinning method, DMAc is preferred in that the material is appropriate for the electrostatic spinning method, and PES is easily dissolved.

An inorganic solid material may be added to raw material liquid 22. Examples of the inorganic solid material may include oxides, carbides, nitrides, borides, silicides, fluorides, and sulfides. Above all, the oxides are preferably used from the viewpoint of workability or the like. Examples of the oxides may include $Al_2O_3$, $SiO_2$, $TiO_2$, $Li_2O$, $Na_2O$, $MgO$, $CaO$, $SrO$, $BaO$, $B_2O_3$, $P_2O_5$, $SnO_2$, $ZrO_2$, $K_2O$, $Cs_2O$, $ZnO$, $Sb_2O_3$, $As_2O_3$, $CeO_2$, $V_2O_5$, $Cr_2O_3$, $MnO$, $Fe_2O_3$, $CoO$, $NiO$, $Y_2O_3$, $Lu_2O_3$, $Yb_2O_3$, $HfO_2$, and $Nb_2O_5$. These may be used alone or in combination of plural kinds thereof.

A mixing ratio of the solvent and the raw material resin in raw material liquid 22 differs depending on the kind of selected solvent and the kind of raw material resin. A proportion of the solvent in raw material liquid 22 is, for example, 60% by mass to 95% by mass, inclusive.

A configuration of the electrostatic spinning mechanism forming second fibers 2F is not limited to the above-described configuration. As long as a mechanism can generate second fibers 2F from raw material liquid 22 by an electrostatic force in a predetermined generation space of second fibers 2F, and can accumulate generated second fibers 2F on the principal surface of first nonwoven fabric 1, the mechanism can be used without being particularly limited. For example, a shape of a section perpendicular to the length direction of discharger 23 may be a shape (V-shaped nozzle) which is gradually reduced from the top to the bottom.

After second nonwoven fabric 2 is formed, a laminate of first nonwoven fabric 1 and second nonwoven fabric 2 is conveyed to spraying device 203 by conveyance roller 31. In spraying device 203, adhesive 4 is sprayed from the upper side of second nonwoven fabric 2. Adhesive 4 is sprayed according to, for example, a spray method or a free fall method.

Spraying device 203 is provided with sprayer 34 including, for example, adhesive tank 32 which is provided above spraying device 203 and accommodates adhesive 4, and spraying member 33 spraying adhesive 4.

After adhesive 4 is sprayed and before third nonwoven fabric 3 is laminated on the laminate, conveyance roller 41 conveys the laminate to heating device 204 provided with heating mechanism 42. Adhesive 4 is melted in heating device 204. The solvent included in second nonwoven fabric 2 is also removed in heating device 204. Adhesive 4 can permeate into the second nonwoven fabric and first nonwoven fabric 1 due to melting of adhesive 4 (and laminate of third nonwoven fabric 3 which will be described later).

Heating mechanism 42 is not particularly limited, and may employ a well-known heating mechanism as appropriate. The heating temperature may be set as appropriate depending on a boiling point of the solvent and a melting point of adhesive 4. The heating temperature is adjusted so that the temperature of the surface of the laminate is preferably 100° C. to 200° C., and is more preferably 120° C. to 170° C.

Next, the laminate is conveyed to laminate device 205 by conveyance roller 51. In the third nonwoven fabric laminate device 205, third nonwoven fabric 3 is supplied from the upper side of the laminate and is laminated on the laminate via adhesive 4. In a case where third nonwoven fabric 3 is long, third nonwoven fabric 3 may be wound on second feed reel 52 in the same manner as first nonwoven fabric 1. In this case, third nonwoven fabric 3 is unwound from second feed reel 52 and is laminated on the laminate. When third nonwoven fabric 3 is laminated, if a part of adhesive 4 applied in first region R1 having the high fiber density is pushed into voids of second region R2 having the lower fiber density, mass M1 and mass M2 of the adhesive satisfy the relationship of M1<M2. Adhesive 4 may permeate into third nonwoven fabric 3.

After third nonwoven fabric 3 is laminated, laminated nonwoven fabric 10 may be pressed while applying pressure thereto with a pair of pressing rolls 53 (pressing rollers 53a and 53b) which are vertically disposed with laminated nonwoven fabric 10 interposed therebetween, and thus the laminate and third nonwoven fabric 3 may be tightly adhered to each other.

Finally, laminated nonwoven fabric 10 is conveyed from laminate device 205, and is then conveyed to collecting device 206 which is disposed on the further downstream side, via roller 61. For example, collecting device 206 has therein collecting reel 62 for winding conveyed laminated nonwoven fabric 10 thereon. Collecting reel 62 is rotatingly driven by motor 63.

(Air Purifier)

Figure 3:
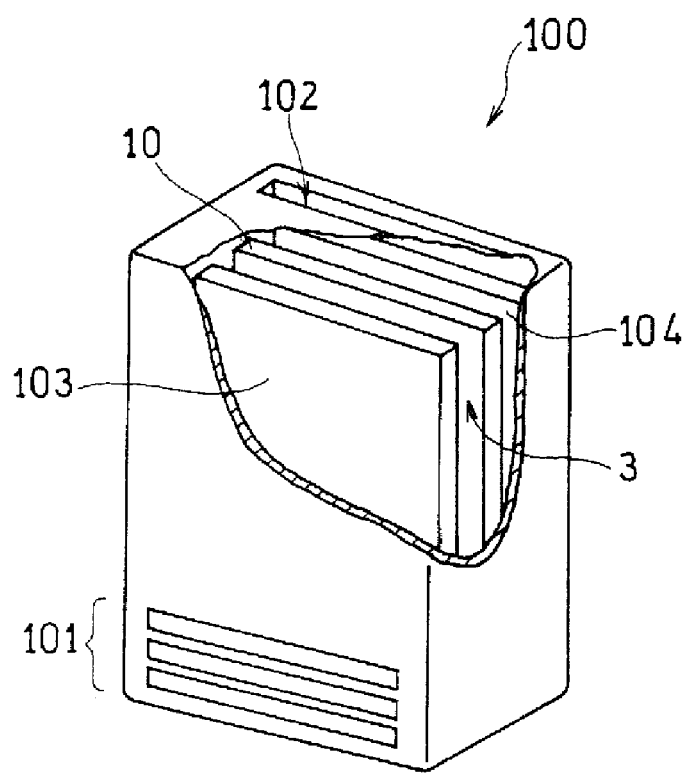
FIG. 3 is a perspective view schematically illustrating an air purifier using any one of the laminated nonwoven fabrics of the present disclosure.

Laminated nonwoven fabric 10 is used in, for example, an air purifier. As exemplified in FIG. 3, air purifier 100 includes sucker 101 of a gas, discharger 102 of the gas, and laminated nonwoven fabric 10 disposed therebetween. Laminated nonwoven fabric 10 may be subjected to pleating in a pleated state and arranged. Laminated nonwoven fabric 10 functions as a filter medium capturing dust in the air. Air purifier 100 including laminated nonwoven fabric 10 has a low pressure loss and excellent dust collection efficiency. From the viewpoint of dust collection efficiency, laminated nonwoven fabric 10 is preferably disposed between sucker 101 and discharger 102 so that third nonwoven fabric 3 faces sucker 101.

Air purifier 100 takes the external air from sucker 101 into the inside of air purifier 100. The taken air is subjected to dust collection during a time when the air passes through laminated nonwoven fabric 10 and the like, and the cleaned air is again discharged from discharger 102 into the outside. Air purifier 100 may further include pre-filter 103 for capturing a large dust or the like between sucker 101 and laminated nonwoven fabric 10. Air purifier 100 may include a deodorizing filter 104 or a humidifying filter (not illustrated) between laminated nonwoven fabric 10 and discharger 102.

EXAMPLES

Hereinafter, Examples of the present disclosure will be described in detail, but the present disclosure is not limited to such Examples.

Example 1

A base material composed mainly of cellulose (thickness T1: 300 μm, D1: 15 μm, and mass per unit area: 42 g/m$^2$) is prepared as the first nonwoven fabric. The first nonwoven fabric has a plurality of third regions R3 having transmittance t3 of 10% to 15% (t3$_{ave}$: 12.5%) and a plurality of fourth regions R4 having transmittance t4 of 28% to 32% (t4$_{ave}$: 30%) which exist mixedly with each other in a region of 35 mm$^2$ (t4/t3=1.7 to 3). Each of the transmittances is measured by cutting the region of 35 mm$^2$ out of the first nonwoven fabric, dividing the region into 25 parts each of 7 mm$^2$, and applying monochromatic light with a wavelength of 380 nm separated by a diffraction grating to the center of each part through a slit having a width of 7 mm by using a spectrophotometer.

By using the manufacturing system illustrated in FIG. 2, the second fibers are accumulated on the conveyed first nonwoven fabric so as to form the second nonwoven fabric, and thus the laminate is manufactured. As a raw material liquid of the second fibers, a DMAc solution containing 20% by mass of PES is used. Average fiber diameter D2 of the obtained second nonwoven fabric is 273 nm, average thickness T2 is 400 μm, and average mass per unit area is 7 g/m$^2$.

Next, particles of adhesive (polyester-based hot melt resin, melting point: about 100° C.) are sprayed from an upper side of the second nonwoven fabric according to a free fall method. An amount of the sprayed adhesive is 5.7 g/m$^2$, and an average particle diameter is 215 μm. The surface of the laminate is heated to 158° C., and then a melt blow nonwoven fabric composed mainly of polypropylene fibers (T2: 165 μm, D3: 5 μm, and mass per unit area: 18 g/m$^2$) is laminated on the second nonwoven fabric as the third nonwoven fabric. Next, the laminated nonwoven fabric is manufactured through pressing using pressing roller. A pressure in the pressing is 5 kPa.

A sample of 30 cm$^2$ is separately cut out of the obtained laminated nonwoven fabric, and is folded in a pleated state (pleat width: 2.5 cm). Next, the laminated nonwoven fabric is spread, and an outer surface of the third nonwoven fabric is checked with a microscope, but floating (peeling) of the third nonwoven fabric is not found.

The second nonwoven fabric is peeled off from the sample, and then an evaluation piece is manufactured by cutting a region of 35 mm$^2$ out of the second nonwoven fabric. The evaluation piece is divided into 25 parts each of 7 mm$^2$, and monochromatic light with a wavelength of 380 nm is applied the center of each part (slit width: 7 mm) so that a transmittance thereof is measured. Next, threshold values of first region R1 and second region R2 are set to 12%, and each part is determined as first region R1 or second region R2. Second region R2 is 10 parts of 25 parts, and first region R1 and second region R2 exist mixedly with each other. It is confirmed that transmittance t1 in first region R1 is included in the range of 2% to 10% (t1$_{ave}$: 6%), and transmittance t2 in second region R2 is included in the range of 15% to 25% (t2$_{ave}$:20%) (t2/t1=1.5 to 15). The parts as first region R1 and the parts as second region R2 respectively face parts as third region R3 and parts as fourth region R4 of the first nonwoven fabric.

The obtained laminated nonwoven fabric in which the first nonwoven fabric is located on a lower side is placed on a horizontal stand, and images of sections of any regions a to j including first region R1 and second region R2 are captured. Next, sections areas A1 and A2 are calculated according to the above-described method, and satisfy the relationship of A1<A2. In other words, mass M1 of the adhesive present between a region of the first nonwoven fabric and a region of the third nonwoven fabric facing first region R1 and mass M2 of the adhesive present between a region of the first nonwoven fabric and a region of the third nonwoven fabric facing second region R2 satisfy the relationship of M1<M2. It is confirmed from the section images that the adhesive is not present between the first nonwoven fabric and first region R1. On the other hand, the adhesive is present so as to be in contact with both of the first nonwoven fabric and the third nonwoven fabric facing second region R2.

A sample having a width of 25 mm×a length of 200 mm is separately cut out of the laminated nonwoven fabric so as to include first region R1 and second region R2, and thus an evaluation piece is manufactured. The peeling strength of the evaluation piece between the first nonwoven fabric and the third nonwoven fabric is measured according to a method conforming to JIS Z0237, and is evaluated as 70 mN.

Comparative Example 1

A laminated nonwoven fabric is manufactured in the same manner as in Example 1 except that a base material (composed mainly of cellulose, thickness T1: 300 μm, D1: 15 μm, and mass per unit area: 42 g/m$^2$) not having third region R3 and fourth region R4 is prepared as the first nonwoven fabric.

A sample of 30 cm$^2$ is separately cut out of the obtained laminated nonwoven fabric. In the same manner as in Example 1, the obtained sample is folded in a pleated state and is spread, an outer surface of the third nonwoven fabric is checked with a microscope, and floating (peeling) of the third nonwoven fabric is found. The presence or absence of first region R1 and second region R2 is checked in the same manner as in Example 1, but second region R2 is not found. Separately, the peeling strength is measured according to the same method as in Example 1, and is 15 mN (test piece size: 25 mm×200 mm). It is confirmed from a section of the obtained laminated nonwoven fabric that the adhesive is not present between the second nonwoven fabric and the first nonwoven fabric.

In the laminated nonwoven fabric of the present disclosure, peeling between the nonwoven fabrics is suppressed. Therefore, the laminated nonwoven fabric of the present disclosure is appropriate for a filter medium of an air purifier or an air conditioner, a separation sheet for a battery, a membrane for a fuel cell, an extracorporeal inspection sheet such as a pregnancy test sheet, a medical sheet for cell culture, a dustproof cloth such as a dustproof mask or a dustproof wear, a cosmetic sheet, a wiping sheet for wiping dust, and the like.

What is claimed is:

1. A manufacturing method of a laminated nonwoven fabric, comprising:
    preparing a first nonwoven fabric containing first fibers, a raw material liquid containing a raw material resin as a raw material of second fibers and a solvent dissolving the raw material resin, and a third nonwoven fabric containing third fibers;
    generating the second fibers from the raw material liquid, and accumulating the second fibers on one principal surface of the first nonwoven fabric so as to form a second nonwoven fabric;
    supplying an adhesive to the second nonwoven fabric; and
    laminating the third nonwoven fabric on the first nonwoven fabric via the adhesive and the second nonwoven fabric,
    wherein an average fiber diameter of the first fibers is larger than an average fiber diameter of the second fibers,
    the second nonwoven fabric has a first region and a second region which exist mixedly with each other,
    wherein a density of the second fibers in the second region is lower than a density of the second fibers in the first region, and
    wherein a part of the adhesive is located between a portion of the first nonwoven fabric facing the second region and a portion of the third nonwoven fabric facing the second region.

2. The manufacturing method of the laminated nonwoven fabric according to claim 1, wherein the second nonwoven fabric is formed according to an electrostatic spinning method.

3. The manufacturing method of the laminated nonwoven fabric according to claim 1, wherein a part of the adhesive is located between a portion of the first nonwoven fabric and the second region of the second nonwoven fabric.

4. The manufacturing method of the laminated nonwoven fabric according to claim 1, wherein the adhesive comes into contact with both the first nonwoven fabric and the third nonwoven fabric.

5. The manufacturing method of the laminated nonwoven fabric according to claim 1, wherein a part of the adhesive passes through the second nonwoven fabric so as to reach the first nonwoven fabric.

6. The manufacturing method of the laminated nonwoven fabric according to claim 1, wherein:
    the second nonwoven fabric is initially formed on the first nonwoven fabric without the adhesive between the first nonwoven fabric and the second nonwoven fabric, and then
    a part of the adhesive supplied to the second nonwoven fabric passes through the second nonwoven fabric so as to reach the first nonwoven fabric.

7. A manufacturing method of a laminated nonwoven fabric, comprising:
- preparing a first nonwoven fabric containing first fibers, a raw material liquid containing a raw material resin as a raw material of second fibers and a solvent dissolving the raw material resin, and a third nonwoven fabric containing third fibers;
- generating the second fibers from the raw material liquid, and accumulating the second fibers on one principal surface of the first nonwoven fabric so as to form a second nonwoven fabric;
- supplying an adhesive to the second nonwoven fabric; and
- laminating the third nonwoven fabric on the first nonwoven fabric via the adhesive and the second nonwoven fabric,
- wherein an average fiber diameter of the first fibers is larger than an average fiber diameter of the second fibers,
- wherein the second nonwoven fabric has a first region and a second region which exist mixedly with each other,
- wherein a density of the second fibers in the second region is lower than a density of the second fibers in the first region,
- wherein a part of the adhesive is located between a portion of the first nonwoven fabric facing the second region and a portion of the third nonwoven fabric facing the second region,
- wherein the first nonwoven fabric has a third region at a position facing the first region, and a fourth region at a position facing the second region, and
- wherein a density of the first fibers in the fourth region is lower than a density of the first fibers in the third region.

* * * * *